(12) United States Patent
Wieck et al.

(10) Patent No.: US 9,416,965 B2
(45) Date of Patent: Aug. 16, 2016

(54) BURNER FOR UNIFORMLY HEATING A LONG FURNACE

(75) Inventors: Dietmar Wieck, Tonisvorst (DE); Christian Windhovel, Garches (FR)

(73) Assignee: L'Air Liquide Société Anonyme Pour L'Étude Et L'Exploitation Des Procedes Georges Claude, Paris (FR)

(*) Notice: Subject to any disclaimer, the term of this patent is extended or adjusted under 35 U.S.C. 154(b) by 432 days.

(21) Appl. No.: 13/985,418

(22) PCT Filed: Feb. 10, 2012

(86) PCT No.: PCT/EP2012/052363
§ 371 (c)(1),
(2), (4) Date: Aug. 14, 2013

(87) PCT Pub. No.: WO2012/110434
PCT Pub. Date: Aug. 23, 2012

(65) Prior Publication Data
US 2013/0323656 A1    Dec. 5, 2013

(30) Foreign Application Priority Data
Feb. 14, 2011 (DE) .......................... 10 2011 011 207

(51) Int. Cl.
*F23D 14/22* (2006.01)
*F23D 14/32* (2006.01)

(52) U.S. Cl.
CPC ................ *F23D 14/32* (2013.01); *F23D 14/22* (2013.01); *F23C 2900/06043* (2013.01); *F23D 2900/00006* (2013.01); *Y02E 20/344* (2013.01)

(58) Field of Classification Search
CPC ...................... F23D 14/22; F23D 14/32; F23C 2900/00006; F23C 2900/06043; Y02E 20/344
USPC ............................................................. 431/8
See application file for complete search history.

(56) References Cited

U.S. PATENT DOCUMENTS

| 5,217,363 A | 6/1993 | Brais et al. |
| 5,743,723 A * | 4/1998 | Iatrides et al. ............ F23D 1/00 431/12 |
| 6,638,057 B2 | 10/2003 | Watson et al. |

FOREIGN PATENT DOCUMENTS

| DE | 102004037620 A1 * | 2/2006 | .............. F23D 14/22 |
| EP | 0038257 A1 | 10/1981 | |

(Continued)

OTHER PUBLICATIONS

International Search Report for PCT/EP2012/052363, mailed Aug. 2, 2013.

*Primary Examiner* — Jorge Pereiro
(74) *Attorney, Agent, or Firm* — Christopher J. Cronin

(57) ABSTRACT

The present invention relates to a burner for a furnace with the following features: a first feed for at least one fuel, preferably with a primary outlet for an oxidizing agent, preferably oxygen; a second feed, surrounding the first feed, with at least one secondary outlet for the oxidizing agent; a third feed, surrounding the second feed, with at least one enveloping jet outlet for the oxidizing agent, wherein the second feed and the third feed are designed such that a first velocity with which the oxidizing agent emerges from the at least one secondary outlet is greater than a second velocity with which the oxidizing agent emerges from the at least one enveloping jet outlet. The second feed thereby preferably enables a first volumetric flow of the oxidizing agent that is greater than or equal to a second volumetric flow of the oxidizing agent through the third feed. By surrounding the oxidizing agent that is fed into a combustion space with an enveloping jet likewise of oxidizing agent, a greater flame length and more uniform heating of a furnace are made possible, which is useful in particular when melting metals in elongated furnaces.

15 Claims, 3 Drawing Sheets

(56) References Cited

FOREIGN PATENT DOCUMENTS

| | | | |
|---|---|---|---|
| EP | 0397088 | A2 | 11/1990 |
| EP | 0663562 | A2 | 7/1995 |
| EP | 1669669 | A1 | 6/2006 |
| EP | 2166284 | A2 | 3/2010 |

* cited by examiner

BURNER FOR UNIFORMLY HEATING A LONG FURNACE

CROSS-REFERENCE TO RELATED APPLICATIONS

This application is a §371 of International PCT Application PCT/EP2012/052363, filed Feb. 10, 2012, which claims §119 (a) foreign priority to German patent application 102011011207.3, filed Feb. 14, 2011.

BACKGROUND

1. Field of the Invention

The present invention relates to a burner, in particular a burner with a long flame, as is used for uniformly heating a long furnace. The invention also relates to a method for uniformly heating a long furnace. Such a burner and the corresponding method are preferably used for melting metals, in particular non-ferrous metals.

2. Related Art

DE 2004 037 620 B4, for example, discloses a burner with a variable flame length, which is operated with gaseous fuel and oxygen and the flame length of which can be set. According to the prior art, furnaces for melting metals are preferably operated with a burner at one end. This burner is usually installed at the inlet door or in the region of the inlet of the furnace, i.e. in the region of a cover. This keeps down the technical complexity and the costs, in particular in comparison with the use of a plurality of burners. For heating larger batches, longer and longer furnaces are being used. This gives rise to the disadvantage that lower temperatures may occur at the end of a furnace opposite from the burner than on the burner side. This may result in deposits of solidified or solid material, which is disadvantageous in particular when melting metals. For example, when processing an alloy, the composition is adulterated if higher-melting constituents solidify out. To avoid this, previously known burners have simply been operated with a greater throughput, i.e. both the amount of fuel fed in and the corresponding amount of oxygen have been increased. However, apart from increased noise, this leads to increased thermal loading of the components of the furnace and the lining, in particular in the region near the burner. It has not been possible to avoid a significant difference in temperature between the burner side and the opposite side.

A burner according to EP 2 166 284 A2 has also been unable to achieve this, even though, by an asymmetric flow profile, this burner makes it possible to adapt to different operating situations.

Other special burners are described in EP 0 038 257 A1 and EP 0 663 562 A2, but these also cannot ensure uniform heating of modern long furnaces.

Against this background, the present invention aims at least partially to overcome the disadvantages known from the prior art. In particular, it is intended to provide a burner and a method for operating a burner with which a long furnace can be heated largely uniformly. In particular, it is intended to achieve a greater flame length, with at the same time good, low-polluting combustion, than with burners according to the prior art.

The aim is achieved by means of a burner and a method for operating a burner as defined in the independent patent claims. Advantageous improvements, which can be used on their own or in combination with one another, are the subject of the respective dependent patent claims.

SUMMARY OF THE INVENTION

According to the present invention, a burner with the following features is proposed:
- a centrally arranged first feed for at least one fuel, in particular with a central primary outlet for an oxidizing agent, preferably oxygen;
- a second feed, surrounding the first feed, with at least one secondary outlet for the oxidizing agent;
- a third feed, surrounding the second feed, with at least one enveloping jet outlet for the oxidizing agent, whereby the second feed and the third feed are designed such that a first velocity of the oxidizing agent emerging from the at least one secondary outlet is greater than a second velocity of the oxidizing agent emerging from the at least one enveloping jet outlet.

A burner is generally a metallic and/or ceramic component which has the task of introducing fuel and an oxidizing agent in a coordinated manner into a combustion space. In this respect, it is especially important to create a flame that is stably aligned and supplied with the fuel and the oxidizing agent. Furthermore, the thermal loading or strain on the components of such a burner should be as low as possible. This is achieved by suitable injection of the fuel and the oxidizing agent. The combustion space, in particular in a furnace, is heated by the flame, heat being transferred into the furnace especially by thermal radiation and convection. In the case of long furnaces, which have in particular a length of over 5 m, preferably over 8 m, a flame of a similar length to that of the furnace is required to achieve uniform heating.

Arranged centrally in the burner is a first feed for at least one fuel. Gaseous and/or liquid fuels may be used as fuel, such as for example natural gas, biogas and oil. In a manner known per se, a primary outlet for an oxidizing agent for stabilizing the flame and reducing the thermal loading of the burner components is preferably provided centrally in the first feed. Furthermore, the burner has a second feed, surrounding the first feed, with at least one secondary outlet for the oxidizing agent. By means of the at least one secondary outlet, oxidizing agent is injected into the furnace. By the secondary outlet, preferably the main portion of the oxygen necessary for the combustion of the fuel is fed to the flame.

The burner also comprises a third feed, surrounding the second feed, with at least one enveloping or shrouding jet outlet for the oxidizing agent. By the at least one enveloping jet outlet, a jet which at least partially surrounds the oxidizing agent emerging at the secondary outlet is created with the oxidizing agent. This makes it, in particular, possible to shield the oxidizing agent that emerges at the secondary outlet from predetermined regions. In particular, the secondary jet is shielded from the often turbulent flue gas stream in the interior of the furnace.

In particular, the secondary jet is also shielded from the fuel jet at least over a certain distance. For this purpose, the first and third feeds are designed such that a first velocity with which the oxidizing agent emerges from the at least one secondary outlet is greater than a second velocity with which the oxidizing agent emerges from the at least one enveloping jet outlet. This achieves the effect that the secondary jet remains relatively compact over a longer distance. In particular, the secondary jet and the enveloping jet flow in an almost laminar manner over a certain distance, so that over this distance mixing between the different jets substantially only occurs as a result of diffusion. On account of the lower velocity of the enveloping jet with respect to the surroundings of the furnace, or optionally the flame, the influences of turbulence are significantly reduced because of reduced friction between the gas streams. The same applies to the frictional effect between the enveloping jet and the secondary jet in comparison with an unshielded secondary jet with respect to the surroundings. Furthermore, influences to which the enveloping jet is subjected are not transferred directly into the secondary jet. This especially achieves two effects that are decisive for the formation of the flame. Firstly, as a result of the reduced effect of friction, both the oxidizing agent jet and the fuel jet flow further into the furnace than is the case with burners according to the prior art. Furthermore, the mixing of fuel and oxidizing agent is delayed over a longer distance. As a result, the temperature of the flame in the region near the burner is reduced in comparison with conventional combustion with the same amount of fuel and oxidizing agent. This has the effect that a greater flame length and a more uniform heat output over the length of the flame are obtained. By contrast with lengthening a flame by increasing the amount and/or velocity of all the substances taking part in the combustion, according to the invention the thermal loading of the furnace is not locally increased. Therefore, the burner device proposed here creates an elongated flame which produces lower temperature differences with the same or increased heat output. At the same time, the production of nitrogen oxides is also reduced, since nitrogen penetrating from outside or caused by impurities in the supplied gases is oxidized to a lesser extent if fewer or even no local temperature peaks occur. In particular, the production of nitrogen oxides is reduced to an amount that at least lies below the legally allowed limit, and in particular is negligible.

The principle of the enveloping jet, which is important for the present invention, can be realized in various forms. On the one hand, individual secondary jets may be surrounded by enveloping jets, which then in turn together form an envelope around the inner fuel jet. On the other hand, however, it is also possible, in particular when using annular nozzles or individual nozzles arranged in the form of a narrow ring, to form an annular secondary jet which is surrounded by an adjacent annular enveloping jet respectively on the inside, on the outside or on the inside and the outside.

In a further advantageous embodiment of the burner according to the invention, the second feed enables a first volumetric flow of the oxidizing agent that is greater than or equal to a second volumetric flow of the oxidizing agent through the third feed.

It has been found that even a relatively small amount or small volumetric flow in the enveloping jet produces a good shielding effect and can stabilize a greater volumetric flow in the secondary jet. The greater volumetric flow, and consequently the greater impulse or momentum, of the enveloped secondary jet allows the flame to be lengthened. The secondary jet can supply 50 to 90% of the required oxidizing agent, preferably 70 to 80%.

In a further advantageous embodiment of the burner according to the invention, the second feed and the third feed can be connected to a source of oxidizing agent by a common connection, the distribution between the second feed and the third feed from a manifold within the burner preferably results from the form, arrangement, number and cross section of at least one secondary outlet of the second feed and of the at least one enveloping jet outlet of the third feed that are connected with the manifold. In this case, valves are not required for the distribution; only the total amount of oxidizing agent fed to the distributing means is set or regulated.

The source for the oxidizing agent is, for example, a pressure tank, or possibly a processing plant for the oxidizing agent. The oxidizing agent is provided via the common connection.

In an advantageous embodiment, this common connection can be controlled and regulated by a likewise common valve, and consequently the amount of oxidizing agent for the second and third feeds, and possibly the primary outlet, can be controlled and regulated. The distribution is preferably achieved by means of a manifold. In particular, the manifold may be located within the burner. This means that, for operation, the burner must merely be connected as a structural unit to one fuel feed connection and to one oxidizing-agent feed connection. The velocities and possibly volumetric flows are obtained due to the form, arrangement, number and cross section of the at least one secondary outlet and the at least one enveloping jet outlet in conjunction with the applied pressure.

In a further advantageous embodiment of the burner according to the invention, the second feed has a plurality of secondary outlets, the secondary outlets surrounding the first feed. They thereby form a kind of ring around the first feed. Depending on the application, this ring may deviate from the form of a circle and/or the distances between the secondary outlets and/or the diameters thereof may be different.

In a further advantageous embodiment of the burner according to the invention, the third feed has a plurality of enveloping jet outlets, at least some of the enveloping jet outlets respectively surrounding a secondary outlet, preferably in the manner of a ring. Here too, depending on the application, this ring may deviate from the form of a circle and/or the distances between the enveloping jet outlets and/or the diameters thereof may be different. In any event, this makes it possible for the respective secondary jet to be enclosed as completely as possible.

In a further advantageous embodiment of the burner according to the invention, the third feed has a plurality of enveloping jet outlets, the enveloping jet outlets preferably together surrounding the second feed. This includes, in particular, the case whereby the second feed already forms a ring with a plurality of secondary outlets and this ring is surrounded on the inner side and/or on the outer side by a plurality of enveloping jet outlets. This form is an approximation to the likewise previously mentioned possible use of substantially concentric annular-gap nozzles.

In a further advantageous embodiment, the burner has at least one nozzle unit, whereby the second feed and the third feed run in the burner, and at least one secondary outlet in each case and all of the enveloping jet outlets that surround the latter being arranged in a common nozzle unit. In this case, the nozzle unit is preferably formed such that it can be exchanged or replaced, in particular that it can be screwed in with an external thread. For cleaning the outlets of the burner, it is particularly advantageous if no components or nozzle ends protrude into the combustion space. This is achieved according to the invention by a substantially planar front side of the nozzle unit.

Also proposed within the scope of the invention is a method for operating a burner, in particular a burner as described above, for creating a flame in a combustion space, wherein
  fuel is injected into the combustion space in the form of a fuel jet by a first feed,
  an oxidizing agent, preferably oxygen, is injected into the combustion space as at least one secondary jet with a secondary velocity by at least one secondary outlet and as at least one enveloping jet with an enveloping jet velocity by at least one enveloping jet outlet, and the oxidizing agent emerging from the at least one secondary outlet is substantially enveloped by the oxidizing agent emerging from the at least one enveloping jet outlet in the manner of a shrouding jet.

The principle according to the invention of introducing oxidizing agent into a combustion space in enveloped jets allows a greater flame length and brings about more uniform combustion.

The oxidizing agent is preferably injected in the form of two or more secondary jets which surround the fuel jet, each secondary jet being enveloped by two or more enveloping jets.

In particular, it is advantageous if the secondary jets surround the fuel jet in an annular manner and are separated from the latter by enveloping jets likewise arranged in an annular manner and/or are surrounded on the outside by enveloping jets.

A favourable operating mode is obtained if the secondary jets supply at least the same amount of oxidizing agent as the enveloping jets, preferably even 50 to 90% of the total amount of oxidizing agent required, in particular 70 to 80%. Pure oxygen is preferably used, in order to keep the amount of thermal ballast low.

The main task of the enveloping jet is to keep down the influences to which the secondary jet is subjected by the surroundings of the furnace, in particular the furnace atmosphere, over as long a distance as possible. This achieves the effect, for example, that the secondary jet remains largely unaffected by turbulences and also mixing with the fuel jet is drawn out over a longer distance. As a result, the flame that is created when the burner is operated according to the invention becomes particularly long. As already described above, its heat output per section of the flame is also reduced, but the heat output remains at least the same over the entire length of the flame as with a conventional flame. On account of the lower frequency of local thermal peaks in comparison with operating a burner in the conventional way, the extent of nitrogen oxides formation is reduced.

BRIEF DESCRIPTION OF THE FIGURES

The invention and the technical environment are explained in more detail below on the basis of the figures. The figures show particularly preferred exemplary embodiments, to which however the invention is not restricted. The figures are schematic and designate the same components with the same reference signs. In the figures.

DETAILED DESCRIPTION OF THE INVENTION

Figure 1:
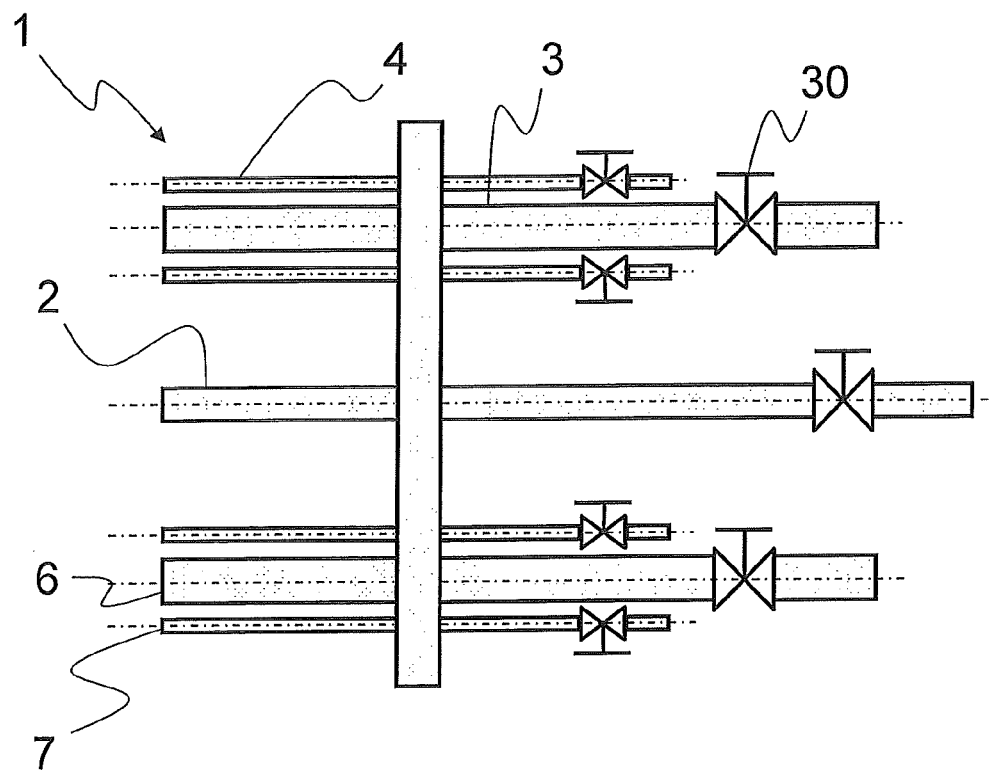
FIG. 1 schematically shows a burner according to the invention in side view.

In FIG. 1, a burner 1 is shown schematically in side view. A first central feed 2 is arranged between a plurality of second feeds 3, only two of which are represented for the sake of simplicity. The second feeds 3 end in secondary outlets 6. The second feeds 3 are surrounded by a plurality of third feeds 4, which end in enveloping jet outlets 7, which in turn surround the secondary outlets 6. In this embodiment of the burner 1 that is represented, the first feed 2, the second feeds 3 and the third feeds 4 are respectively connected to separate valves 30, which is schematically indicated. Other embodiments are described further below.

Figure 2:
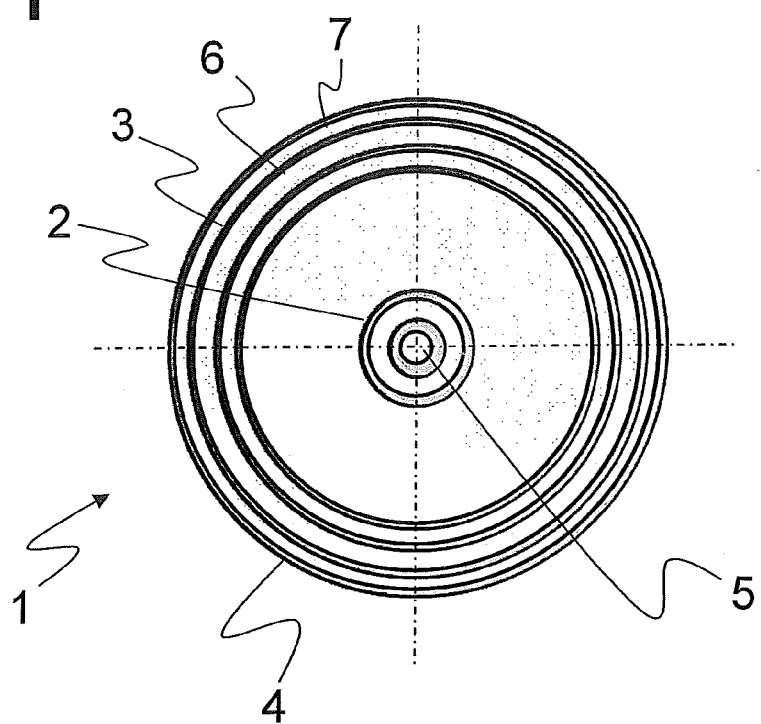
FIG. 2 schematically shows a burner according to the invention in front view.

FIG. 2 schematically shows a front view of a burner 1 according to the invention, which is suitable for operation with the method according to the invention, the respective outlets being formed as circular rings. Shown centrally in the burner 1 according to the invention is a primary outlet 54 oxidizing agent, in particular oxygen, which in this example is located within the first feed 2, which is a configuration that is typical and known per se for stabilising a flame. The first feed 2 is in turn arranged centrally with respect to the second feed 3, which in turn is surrounded on both sides by a third feed 4. This has the effect that a secondary jet, which emerges from the shown secondary outlet 6 perpendicularly to the plane of the drawing, is surrounded both on the inside and the outside by an enveloping jet, which emerges from the enveloping jet outlet 7.

Figure 3:
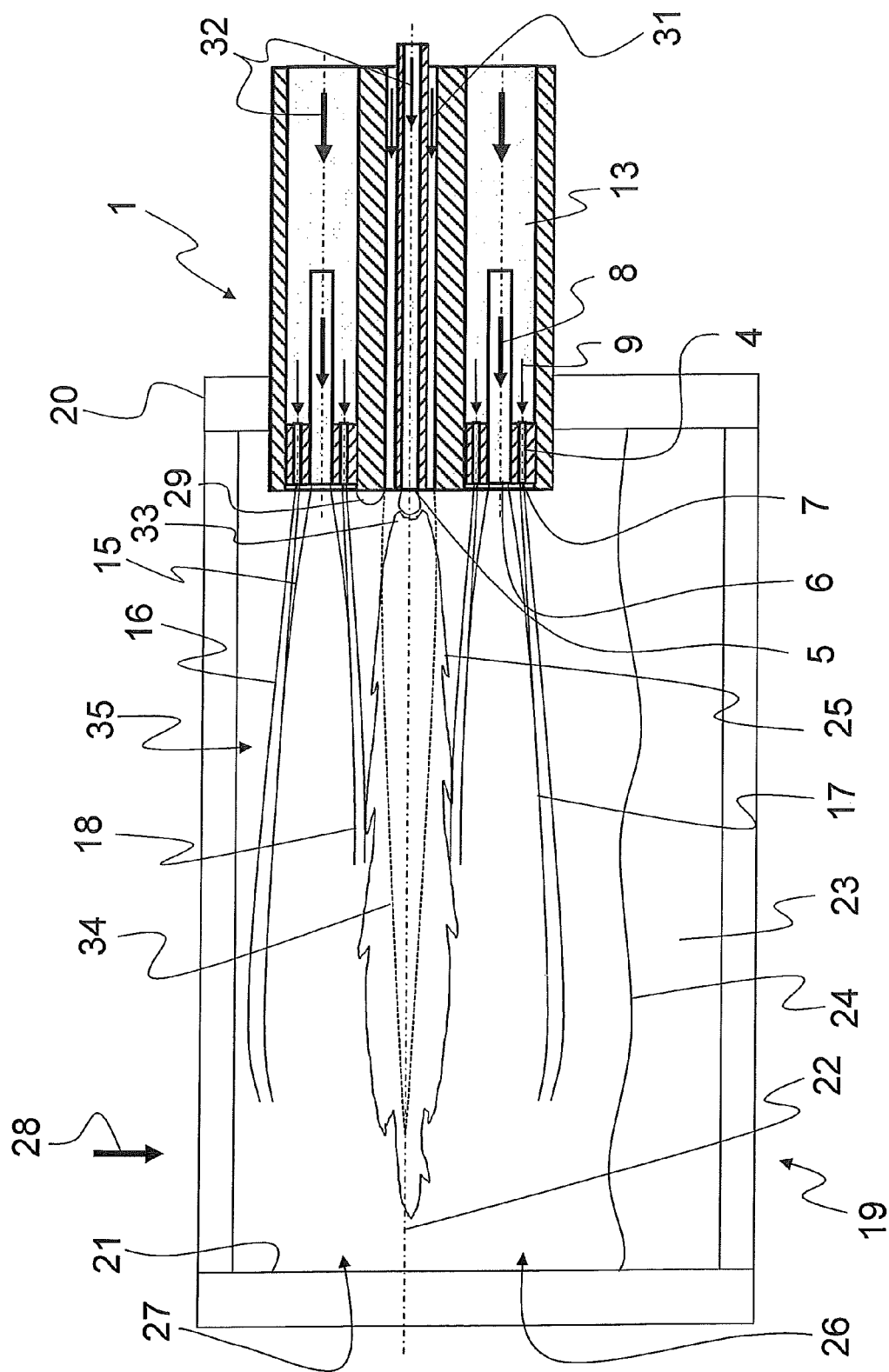
FIG. 3 shows a partially sectional schematic side view of a furnace with a burner according to the invention in operation.

In FIG. 3, a partially sectional schematic side view of a furnace 19 with a burner 1 according to the invention is shown. This burner 1 is arranged at a first end 20 of the furnace 19 and is directed towards a combustion space 35. As indicated by arrows, the burner 1 is supplied with fuel 31 and with oxidizing agent 32. Arranged centrally in the burner 1 is a first feed 2 for fuel 31, generally comprising a central primary outlet 5 for oxidizing agent 32, which serves to stabilize the flame at a certain distance from the burner 1. Further oxidizing agent 32 may be injected into the combustion space 35 through secondary outlets 6. During operation, this causes the formation of a fuel jet 34, which together with the oxidizing agent from the primary outlet 5 and the oxidizing agent from the secondary outlets 6 can form a flame 25. A flame root 33, which separates the flame (at least) thermally from the structure of the burner 1 is in this case produced by the primary outlet. According to the invention, arranged around the secondary outlets 6 are enveloping jet outlets 7, which are likewise supplied with oxidizing agent 32 through third feeds 4. In this case, the geometries and the pressure and other parameters are chosen such that the oxidizing agent 32 emerges from the secondary outlets 6 with a first velocity v1, which is equal to or greater than a second velocity v2, with which the oxidizing agent 32 emerges from the enveloping jet outlets 7. As a result is formed a secondary jet 15 of oxidizing agent 32, which is stabilized by an enveloping jet 16 surrounding it. In particular when the enveloping jet 16 has a second velocity v2 between the first velocity v1 of the secondary jet 15 and the velocity of the surroundings, a lengthened flame 25 is obtained with uniform burning of the fuel jet 35.

In the schematic representation of FIG. 3, the secondary jet 15 and the enveloping jet 16 are respectively formed by a plurality of secondary jet components 17 and enveloping jet components 18. In the centre of the secondary jet components 17 and enveloping jet components 18 is the flame 25. Shown next to the primary outlet 5 is a detector 29, which measures the temperature of the flame, for example by radiation measurement, e.g. of the infrared or ultraviolet radiation, and can consequently supply regulating values for operating the burner 1. It is also shown purely schematically here that a first volumetric flow 8, from which the secondary jet components 17 are formed, is greater than a second volumetric flow 9, from which the enveloping jet components 18 are formed.

Indicated between the first end 20 and the second end 21 of the furnace 19 is a geometrical axis 22, along which the flame 25 approximately forms. In the case of typical furnaces, the alignment of the flame is approximately horizontal, which is illustrated by an arrow for the Earth's gravitational field 28. In the region below the axis 22, which is referred to as the near region 26, there is molten metal 23 with a surface 24. Above the axis there is a remote region 27 of the combustion space 35. A heat exchange takes place from the flame 25 into the molten metal 23 by thermal radiation and convection in the near region 26.

Figure 4:
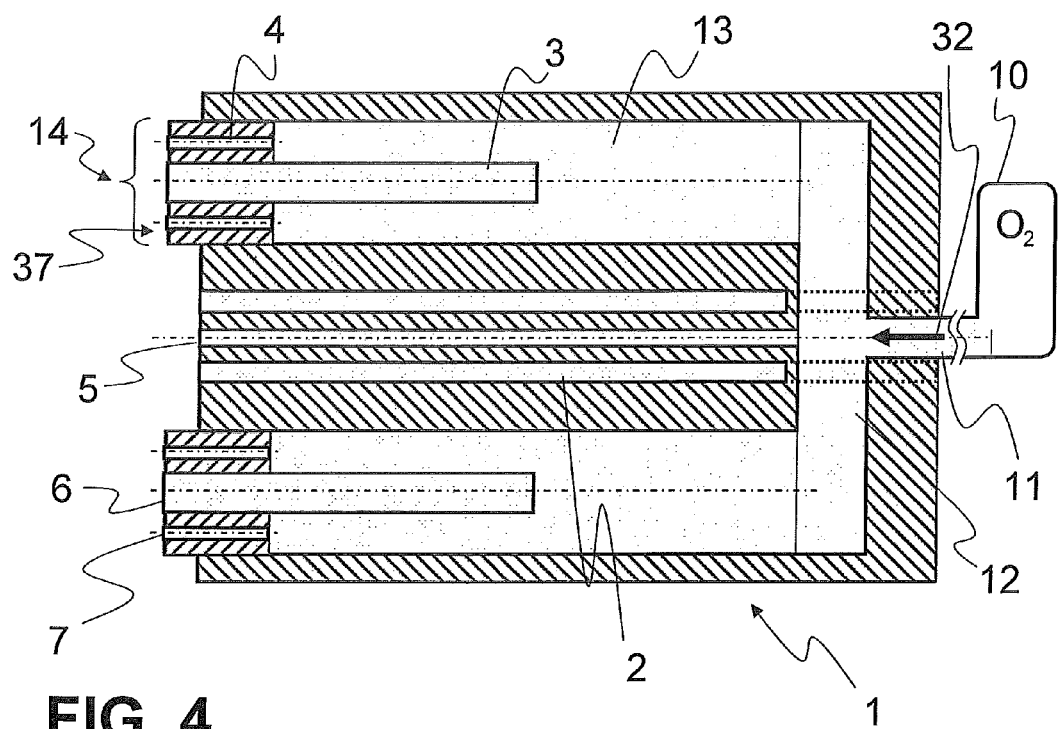
FIG. 4 shows a preferred embodiment of the burner according to the invention in a schematic side section.

In FIG. 4, a preferred embodiment of a burner 1 according to invention is shown schematically in longitudinal section, similar to that in FIG. 3. The same parts are provided with the same reference signs as in FIG. 3. In the case of this burner 1, the secondary outlet 6 and the enveloping jet outlet 7 as well as the primary outlet 5 are supplied with the oxidizing agent 32 by a common line 13 through a common connection 11 from a common source 10. The common line is connected to the common connection 11 by a manifold 12. The jet form, amount and velocity of the secondary jet 15 and the enveloping jet 16 (both not shown here) are determined by the number, the cross-section and the position of the second supply line 3 and the third supply line 4. The fuel is fed by the first supply line 2, in which the primary outlet 5 for oxidizing agent is centrally arranged. The front side of each nozzle unit 14 is preferably of a planar design, which has advantages when cleaning, since protruding nozzles, such as those known from the prior art, are more easily damaged or deformed.

Figure 5:
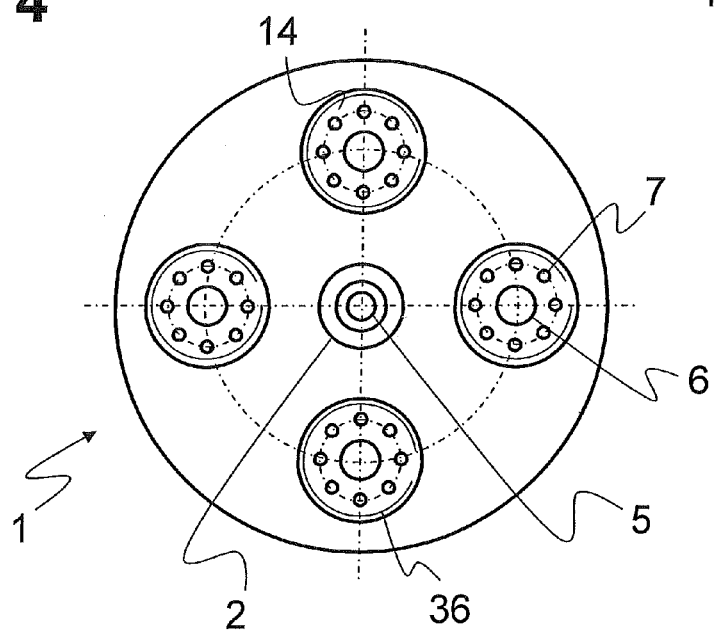
FIG. 5 shows a front view of a preferred exemplary embodiment of a burner according to the invention.

In FIG. 5, a burner 1, such as that shown for example in FIG. 3 or FIG. 4, is shown in a front view, a configuration with four secondary outlets 6 having been chosen by example. A greater number is possible however. The secondary outlets 6 are arranged like a ring around the first feed 2 and the primary outlet 5.

Each secondary outlet 6 is surrounded by enveloping jet outlets 7. A secondary outlet 6, with the enveloping jet outlets 7 surrounding it, is in each case arranged in a circular nozzle unit 14, which has been screwed with an external thread into the burner 1.

In principle, it is also possible to use larger exchangeable nozzle units which have a number of groups of secondary outlets 6 and enveloping jet outlets 7. Such nozzle units 14 in different forms may serve for converting burners for different applications or are easily exchanged when they become worn.

The invention at least partially solves the technical problems described in connection with the prior art. In particular, a uniform heat output is possible over an extended distance. Furthermore, the occurrence of thermal peaks both in the flame and in the region of the furnace near the burner is avoided and the occurrence of noise is reduced as a result of a less turbulent flame.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF DESIGNATIONS 1 burner
2 first feed
3 second feed
4 third feed
5 primary outlet
6 secondary outlet
7 enveloping jet outlet
8 first volumetric flow
9 second volumetric flow
10 source
11 common connection
12 manifold
13 common line
14 nozzle unit
15 secondary jet
16 enveloping jet
17 secondary jet component
18 enveloping jet component
19 furnace
20 first end
21 second end
22 axis
23 molten metal
24 surface
25 flame
26 near region
27 remote region
28 Earth's gravitational field
29 detector
30 valve
31 fuel
32 oxidizing agent
33 flame root
34 fuel jet
35 combustion space
36 external thread
37 front side

What is claimed is:

1. A burner for combusting fuel and oxidizing agent in a long furnace, comprising: a first feed adapted and configured to inject a jet of fuel into a combustion space of a long furnace;

a second feed leading to at least one secondary outlet adapted and configured to inject oxidizing agent as at least one secondary jet around the fuel jet; and a third feed leading to at least one enveloping outlet adapted and configured to inject oxidizing agent as at least one enveloping jet, wherein:

said at least one secondary jet being equal in number to that of said at least one enveloping jet;

each of said at least one secondary jet is enveloped by a corresponding one of said at least one enveloping jet;

each of said second and third feeds is supplied with oxidizing agent by a same oxidizing feed line via a manifold;

the number of said at least one secondary outlet, a cross-section of each of said at least one secondary outlet, and a position of each of said at least one secondary outlet are adapted and configured to inject the at least one secondary jet at a secondary velocity (v1);

the number of said at least one enveloping outlet, a cross-section of each of said at least one enveloping outlet, and a position of each of said at least one enveloping outlet are adapted and configured to inject the at least one secondary jet at a enveloping velocity (v2);

the at least one secondary outlet comprises a plurality of secondary outlets, the at least one secondary jet comprises a plurality of jets, and said plurality of secondary outlets are radially distributed around the first feed; and v1>v2.

2. The burner of claim 1, wherein the at least one enveloping outlet comprises a plurality of enveloping outlets, the at least one enveloping jet comprises a plurality of enveloping jets, and each one of the plurality of enveloping jets envelops an outer portion of a corresponding one of the plurality of secondary jets.

3. The burner of claim 1, wherein additional oxidizing agent is injected into a central portion of the fuel jet.

4. A burner for combusting fuel and oxidizing agent in a long furnace, comprising: a first feed adapted and configured to inject a jet of fuel into a combustion space of a long furnace; a second feed leading to at least one secondary outlet adapted and configured to inject oxidizing agent as at least one secondary jet around the fuel jet; and a third feed leading to at least one enveloping outlet adapted and configured to inject oxidizing agent as at least one enveloping jet, wherein:

said at least one secondary jet being equal in number to that of said at least one enveloping jet;

each of said at least one secondary jet is enveloped by a corresponding one of said at least one enveloping jet;

each of said second and third feeds is supplied with oxidizing agent by a same oxidizing feed line via a manifold;

the number of said at least one secondary outlet, a cross-section of each of said at least one secondary outlet, and a position of each of said at least one secondary outlet are adapted and configured to inject the at least one secondary jet at a secondary velocity (v1);

the number of said at least one enveloping outlet, a cross-section of each of said at least one enveloping outlet, and a position of each of said at least one enveloping outlet are adapted and configured to inject the at least one secondary jet at a enveloping velocity (v2);

the at least one enveloping outlet comprises an inner, annular enveloping outlet concentrically disposed within an outer, annular enveloping outlet;

the at least one secondary outlet comprises one annular secondary outlet concentrically disposed around the inner, annular enveloping outlet and concentrically disposed within the outer, annular enveloping outlet;

the at least one secondary jet comprises one annular secondary jet; and the at least one enveloping jet is configured as a pair of concentric annular jets that envelop inner and outer portions of the annular secondary jet.

5. A burner for combusting fuel and oxidizing agent in a long furnace, comprising: a first feed adapted and configured to inject a jet of fuel into a combustion space of a long furnace; a second feed leading to at least one secondary outlet adapted and configured to inject oxidizing agent as at least one secondary jet around the fuel jet; and a third feed leading to at least one enveloping outlet adapted and configured to inject oxidizing agent as at least one enveloping jet, wherein:

said at least one secondary jet being equal in number to that of said at least one enveloping jet;

each of said at least one secondary jet is enveloped by a corresponding one of said at least one enveloping jet;

each of said second and third feeds is supplied with oxidizing agent by a same oxidizing feed line via a manifold;

the number of said at least one secondary outlet, a cross-section of each of said at least one secondary outlet, and a position of each of said at least one secondary outlet are adapted and configured to inject the at least one secondary jet at a secondary velocity (v1);

the number of said at least one enveloping outlet, a cross-section of each of said at least one enveloping outlet, and a position of each of said at least one enveloping outlet are adapted and configured to inject the at least one secondary jet at a enveloping velocity (v2);

the burner has at least one nozzle unit;

the second and third feeds run through the burner; and the at least one secondary outlet and the at least one enveloping outlet are arranged in the nozzle unit.

6. The burner of claim 5, wherein the nozzle unit is adapted and configured such that it may be exchanged with a different nozzle by unscrewing the nozzle unit from the burner.

7. The burner of claim 5, wherein the nozzle unit has a substantially planar front side.

8. A furnace installation comprising a furnace and the burner of claim 7 mounted on an end of the furnace, wherein the planar front side is flush with the end of the furnace.

9. A method for creating a flame in a combustion space of a long furnace with a burner mounted on an end of the furnace through combustion of fuel and oxidizing agent, comprising the steps of:

injecting fuel from a first feed of the burner into the combustion space as a fuel jet;

injecting the oxidizing agent from an at least one secondary outlet of a second feed of the burner into the combustion space as at least one secondary jet with a secondary velocity (v1); and injecting the oxidizing agent from an at least one enveloping outlet of a third feed of the burner into the combustion space as at least one enveloping jet with an enveloping jet velocity (v2), wherein the at least one secondary jet is enveloped by the at least one enveloping jet outlet and v1>v2;

the at least one secondary jet comprises two or more secondary jets which surround the fuel jet, the at least one enveloping jet comprises two or more enveloping jets, and each of the secondary jets is enveloped by a corresponding one of the enveloping jets.

10. The method of claim 9, wherein the at least one secondary jet comprises one annular secondary jet that annularly surrounds the fuel jet, the at least one enveloping jet comprises an annular enveloping jet that annularly surrounds an outer portion of the annular secondary jet.

11. The method of claim 9, wherein the at least one secondary jet supplies at least a same amount of oxidizing agent as the at least one enveloping jet.

12. The method of claim 11, wherein the at least one secondary jet supplies 50 to 90% of a total amount of the oxidizing agent injected from the second and third feeds.

13. The method of claim 11, wherein the at least one secondary jet supplies 70 to 80% of a total amount of the oxidizing agent injected from the second and third feeds.

14. The method of claim 9, wherein the oxidizing agent is oxygen.

15. A method for creating a flame in a combustion space of a long furnace with a burner mounted on an end of the furnace through combustion of fuel and oxidizing agent, comprising the steps of:

injecting fuel from a first feed of the burner into the combustion space as a fuel jet;

injecting the oxidizing agent from an at least one secondary outlet of a second feed of the burner into the combustion space as at least one secondary jet with a secondary velocity (v1); and injecting the oxidizing agent from an at least one enveloping outlet of a third feed of the burner into the combustion space as at least one enveloping jet with an enveloping jet velocity (v2), wherein the at least one secondary jet is enveloped by the at least one enveloping jet outlet and v1>v2, wherein the at least one secondary jet comprises one annular secondary jet that annularly surrounds the fuel jet, the at least one enveloping jet comprises a pair of annular jets concentric with the annular secondary jet that envelop inner and outer portions of the annular secondary jet.

* * * * *